United States Patent [19]

Ryoke et al.

[11] Patent Number: 5,238,753
[45] Date of Patent: Aug. 24, 1993

[54] MAGNETIC RECORDING MEDIUM KUBBED WITH A SUPER HARD ALLOY BLADE CONTAINING TUNGSTEN CARBIDE POWER AND COBALT

[75] Inventors: Katsumi Ryoke; Youichi Hayata; Junji Yazawa; Toshihiko Miura; Masaki Suzuki; Tatsuya Oguri, all of Kanagawa, Japan

[73] Assignee: Fuji Photo Film Co., Ltd., Kanagawa, Japan

[21] Appl. No.: 616,958

[22] Filed: Nov. 21, 1990

[30] Foreign Application Priority Data

Nov. 21, 1989 [JP] Japan ............................ 1-302792
Jan. 30, 1990 [JP] Japan ............................ 2-19716
Apr. 4, 1990 [JP] Japan ............................ 2-88308

[51] Int. Cl.$^5$ ........................................... G11B 5/00
[52] U.S. Cl. ................................ 428/694 BY; 428/900; 428/694 BU; 427/130
[58] Field of Search ............... 428/694, 900, 695; 51/307, 309; 427/130

[56] References Cited

U.S. PATENT DOCUMENTS

| | | | |
|---|---|---|---|
| 2,818,850 | 1/1958 | Schwartzkopf et al. | 51/309 |
| 4,411,672 | 10/1983 | Ishizuka | 51/309 |
| 4,840,818 | 6/1989 | Chikamasa et al. | 427/130 |
| 4,888,212 | 12/1989 | Iida et al. | 427/130 |

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic recording medium having well-balanced properties with respect to head abrasion characteristics, head cleaning characteristics and drop out characteristics is disclosed, which comprises a non-magnetic support having thereon a magnetic layer containing a ferromagnetic powder and a binder, wherein the magnetic layer has been brought into contact with a carbon steel alloy or super hard alloy made from powders having a Mohs' hardness of at lease 6 and rubbed therewith. A process of producing the magnetic recording medium is also disclosed.

12 Claims, 1 Drawing Sheet

MAGNETIC RECORDING MEDIUM KUBBED WITH A SUPER HARD ALLOY BLADE CONTAINING TUNGSTEN CARBIDE POWER AND COBALT

FIELD OF THE INVENTION

This invention relates to a magnetic recording medium comprising a non-magnetic support and a magnetic layer having excellent head abrasive characteristics and also to a process of producing the magnetic recording medium.

BACKGROUND OF THE INVENTION

In general, as magnetic recording media for audio tapes, video tapes, computer tapes (disks, memory tapes), etc., magnetic recording medium each having on a non-magnetic support a magnetic layer composed of a ferromagnetic powder dispersed in a binder have been used.

Recently, high-density recording has been required for these magnetic recording media, and the increase of signal and decrease of noise in signal/noise have been attained by fining the particle sizes of the ferromagnetic powder, using a ferromagentic allow powder, increasing the filling extent of the ferromagentic powder in the magnetic layer, or greatly improving the smoothness of the magnetic recording medium.

However, for high-density recording, it has been required that the magnetic recording medium has good antistatic characteristics, good head cleaning characteristics, good running durability characteristics, and good head abrasive characteristics, and further that the occurrence of the drop out or decrease of signal/noise ratio in recording and reproducing caused by foreign matters such as dusts, etc., on the magnetic recording medium is less.

For the purposes, carbon black and abrasives having a Mohs' hardness of at least 8 are used. Practically, these techniques are disclosed in U.S. Pat. Nos. 3,630,910, 3,833,412, 4,614,685, 4,539,257, and JP-A-59-193533 (the term "JP-A" as used herein means an "unexamined published Japanese patent application").

In regard to the magnetic layer of the magnetic recording medium produced by the aforesaid technique, it is considered that the magnetic layer is generally very smooth since the granular components are strongly fixed in the layer. However, according the inventor's investigation, it has been found that insufficiently fixed granular components (e.g., a ferromagnetic powder and an abrasive), etc., exist on the surface of the magnetic layer. Such insufficiently fixed granular components sometimes release in, e.g., a video tape, and attach to a magnetic head to cause clogging of the magnetic head and also to cause the occurrence of drop out. Also, such a release of the ferromagnetic powder gradually decreases the amount of the ferromagnetic powder near the surface of the magnetic layer and hence by repeating running of the magnetic recording tape, there also occurs deterioration in the electromagnetic properties (lowering of output).

The inventors previously found a process involving grinding of the magnetic layer surface of a magnetic recording medium for preventing the aforesaid occurrence of the drop out and clogging of the magnetic head and for reducing lowering of output by repeated running of the magnetic recording medium, and disclosed in JP-A-62-172532 and JP-A-63-98834. That is, in the aforesaid invention, by grinding the surface of a smoothened magnetic layer using a high hardness grinder such as a diamond wheel or a fixed sapphire blade, attached matters on the surface of the magnetic layer and granular components which are in an easily releasable state are removed to decrease the amount of releasing materials from the magnetic layer. By grinding the surface of the magnetic layer as described above, the occurrences of drop out and clogging of the magnetic head and the occurrence of lowering of the output by long time running of the magnetic recording tape can be effectively prevented.

Also, in the field of a magnetic disk, it is known to varnish for surface smoothing. For example, a surface smoothing apparatus for a magnetic disk base plate by continuously supplying a wrapping film onto the sliding surface of the magnetic head (JP-B-58-46768, the term "JP-B" as used herein means an "examined published Japanese patent application") and a surface smoothing method of a base plate for a magnetic disk by rotating a base plate for a magnetic disk and contacting a varnish head having a roughened portion composed of a grinding grain layer containing hard fine grains formed on the slider surface thereof to the surface of the rotating base plate (JP B-58-46767) are known.

Other techniques relating to varnishing of magnetic recording media are also disclosed in JP-A-56-90429 and JP-B-63-259830.

However, even by these techniques, it is very difficult to balance the running durability characteristics, head abrasion characteristics, and head cleaning characteristics, and the reduction of lowering of drop out is yet insufficient.

Practically, if the magnetic recording medium is too smooth, the coefficient of friction is increased to deteriorate the running durability characteristics. Thus, carbon black and an abrasive having a Mohs' hardness of at least 6 are used for a magnetic recording medium for securing the running durability thereof but the abrasion of the magnetic head is increased. Also, if the addition amount of the abrasion in the aforesaid additives is decreased for adjusting the head abrasive characteristics, the head cleaning characteristics are deteriorated.

Thus, it is very difficult to adjust the aforesaid characteristics in good balance.

SUMMARY OF THE INVENTION

A first object of this invention to solve the aforesaid problems in conventional techniques and to provide a magnetic recording medium having good running durability characteristics, head abrasive characteristics, head cleaning characteristics, and drop out characteristics which are adjusted in good balance.

A second object of this invention is to provide a magnetic recording medium giving less head abrasion, in particular, less head abrasion at the beginning of tape running, causing no head clogging, and having an excellent RF (radio frequency) output.

Hitherto, for improving the electromagnetic properties of a magnetic recording medium, it has been practiced to orient the ferromagentic powder to the longitudinal direction in the coated surface to lay down the particles to the longitudinal direction as much as possible. By such a method, the output is surely increased and the squareness ratio (Br/Bm) is improved but the decrease of drop out and the improvement of the running durability such as still life are insufficient. The occurrence of drop out is partially based on a binder but is mainly based on the ferromagentic powder.

Thus, as the result of investigating the influence of the ferromagnetic powder on the coefficient of friction and drop out, the inventors have found that the positional relation of the ferromagnetic powder existing in a magnetic layer largely influences the coefficient and the occurrence of drop out. For example, as the result of measuring the positions of ferromagnetic iron oxide powders using a high-speed electron diffraction method for solving the aforesaid problems, it has been discovered that the position thereof has a large mutual relation with the occurrence of drop out and the still image durability (still life) and also it has been discovered that a very excellent metallic recording medium is obtained by bringing the surface of a magnetic layer into contact with a specific metallic material and rubbing the surface with the material. The present invention has been achieved based on the discovery.

It has now been discovered that the aforesaid objects can be attained by the present invention as shown below.

That is, according to this invention, there is provided a magnetic recording medium having on a non-magnetic support a magnetic layer containing a ferromagnetic powder and a binder, the surface of the magnetic layer being brought in contact with a carbon steel alloy or super hard alloy made from powders having a Mohs' hardness of at least 6 and rubbing the surface with the alloy (hereafter referred to as "the contact-rubbing treatment").

DETAILED DESCRIPTION OF THE INVENTION

Figure 1:
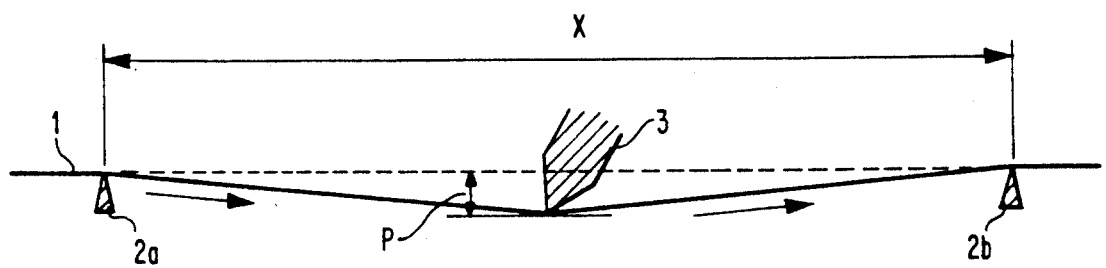
FIG. 1 illustrates the state of a magnetic tape subjected to the contact-rubbing treatment of this invention according to a blading method.

In this invention, the carbon steel alloy or the super hard alloy is used along with the contact rubbing treatment for the reason as follows.

That is, in a conventional case of using a blade of a ceramic such as alumina, silica, zirconia, etc., or a glass blade, the surface of the magnetic layer is simply ground by the edge of the blade and the surface of the blade does not have a function of grinding for smoothing the surface of the magnetic layer but, on the other hand, the surface of the super hard alloy has fine unevenness and it is considered that the surface of the magnetic layer is not only ground by the edge of the alloy but also ground by the surface of the alloy. Also, it is considered that the aforesaid effect by the super hard alloy is strong and the ferromagnetic powders existing on the surface of the magnetic layer are ground off to give the effect of this invention.

On the other hand, in the case of using the carbon steel alloy, it is considered that grinding of the ferromagnetic powders existing on the surface of the magnetic layer is accelerated by the powders of the ferromagnetic powders and the carbon steel alloy formed by grinding of each other.

As the metallic material which is used for rubbing the surface of the magnetic layer, a carbon steel alloy or a super hard alloy each made from powders having a Mohs' hardness of at least 6 is used in this invention and as such an alloy, stainless steel, tungsten carbide (preferably Co-containing WC), titanium carbide (TiC), etc., can be effectively used. The form of the alloy may be a plate (e.g., a blade) or a rod matching the width of the magnetic recording tape being rubbed or slided but a plate form is preferred.

For the aforesaid purpose, a super hard alloy composed of tungsten carbide (WC) as the main component is preferred. As a metal component for binding the tungsten carbide, cobalt is preferably used. The content of Co in the alloy is generally from 1 to 40% by weight, preferably from 5 to 40% by weight, and more preferably from 5 to 20% by weight.

Ta can also be used as a metal component of the alloy with WC, and in this case, the content of Ta is preferably from 0.01 to 40% by weight. Furthermore, a solid solution alloy composed of WC-TiC-TaC can also be used, the alloy preferably containing at least 50 wt % WC and more preferrably having the composition of 50 to 85 wt % WC, 5 to 15 wt % TiC, 1 to 20 wt % TaC and 5 to 15 wt % Co.

An average particles size of WC powder constituting the supper hard alloy is preferably from 0.1 $\mu$m and more preferably from 0.2 to 0.7 $\mu$m, and an angular WC powder is preferred. Such a powder is preferably bound by Co.

As the contact-rubbing (sliding) condition, the number of contact-rubbing is from once to 10 times, the rubbing speed is generally from 10 to 1,200 m/min, and the temperature and the humidity are preferably from 5° to 60° C. and from 30 to 90% RH, respectively.

The contact area is preferably not more than 5 mm × tape width. The contact may be conducted at two or more positions of the tape. In the case of using a blade of the alloy, the contact-rubbing may be practiced by the edge side or the back side of the blade. Also, the blade may be rectangular or slant to the running direction of the tape.

Figure 2:
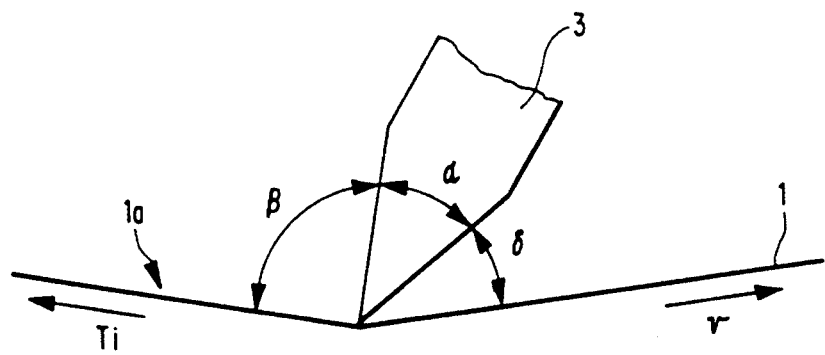
FIG. 2 illustrates an enlarged view of the portion of FIG. 1 where a blade is brought into contact with the magnetic tape.

The contact-rubbing treatment can be effected by a blading method as illustrated in FIG. 1, wherein the pushing-down extent (P) of the alloy blade 3 to the running tape 1 is from 10× cm to X/10,000 cm, and preferably from X cm to X/1,000 cm, wherein X is the interval between the supporting guides 2a and 2b. The pushing-down extent of the alloy blade to the tape is from 1 mm to 30 mm from the level (indicated with a dot line) at which the tape is not brought into contact with the alloy blade 3. FIG. 2 illustrates an enlarged view of the portion of FIG. 1 where the blade 3 is brought into contact with the magnetic layer surface 1a of the tape 1. The edge angle of the blade is generally from 5° to 180° and preferably from 5° to 90°. In the case of rubbing of magnetic tapes as shown in FIG. 2, however, the edge angle $\alpha$ is from 0.1° to 180°, preferably from 30° to 100° and more preferably from 60° to 90°; the lap angle $\beta$ is from 60° to 170° and preferably from 80° to 170°; and the other lap angle is from 0° to 90°. Further, the pushing force of the blade 3 to the tape 1 is generally from 1 to 100 g; the tape tension $T_1$ is from 1 to 300 g and preferably from 50 to 250 g; and the tape running speed v is from 60 to 1,200 m/min and preferably from 200 to 500 m/min.

The magnetic recording medium of this invention has a fundamental structure that a magnetic layer containing a ferromagnetic powder and a binder, and optionally additives (carbon black, an abrasive, a lubricant, etc.) is formed on a non-magnetic support, and preferably a back layer containing a binder, carbon black, etc., is formed on the opposite surface of the non-magnetic support to the magnetic layer-carrying surface.

As the ferromagnetic fine powder for use in this invention, there are known ferromagnetic fine powders such as $\gamma$-$Fe_2O_3$, Co-containing (Co-absorbed, Co-modified, or Co-doped)$\gamma$-$Fe_2O_3$, $Fe_3O_4$, Co-containing (Co-absorbed, Co-modified, or Co-doped) $Fe_3O_4$, $FeO_x$ ($1.3 \leq X \leq 1.50$), Co-containing (Co-absorbed, Co-modified, or Co-doped) $FeO_x$, $CrO_2$, $CrO_2$ containing at least one of Rn, To, Sb, Sr, Fe, Ti, V, Mn, and $Cr_2O_3$, Fe, Co, Ni, an Fe-Co alloy, an Fe-Ni alloy, an Fe-Co-Ni alloy, a Co-Ni-P alloy, a Co-Ni-Fe-B alloy, an Fe-Ni-Zn alloy, a Ni-Co alloy, a Co-Ni-Fe alloy, an Fe-N alloy, an Fe-Co-Cr alloy, a MnBi alloy, etc.

The particle sizes of these ferromagnetic fine powders are from about 0.005 to 1 $\mu$m in the length and from about 1/1 to 50/1 in the acicular ratio. Also, the specific area of the ferromagnetic powder is from about 1 $m^2/g$ to 70 $m^2/g$.

The water content of these ferromagnetic fine powders is from 0.2 to 2.0% by weight. Also, the water content of the coating composition using the ferromagnetic powder is from 0.00 to 2.00% by weight.

Before dispersing the ferromagnetic powders in a binder, a dispersing agent, a lubricant, an antistatic agent, etc., may be adsorbed onto the surfaces of these ferromagnetic powders for each purpose by impregnating the powders with the additive in a solvent as described later.

It is preferred that these ferromagnetic fine powders contain a heavy metal such as Sr, Pb, Mn, Ni, Cd, Cr, Al, Si, Ti, Cu, Zn, etc., in an amount of within 1% by weight. Furthermore, alumina, etc., may be applied onto the ferromagnetic fine powder and fused.

Also, as the ferromagnetic powder for use in this invention, a tabular hexagonal barium ferrite can be used. The particle sizes of the barium ferrite are from about 0.001 to 1 $\mu$m in diameter and from $\frac{1}{3}$ to 1/20 of the diameter in the thickness. The specific gravity of the barium ferrite is from 4 to 6 g/cc and the specific area thereof is from 1 $m^2/g$ to 70 $m^2$.

Before dispersing the barium ferrite, a dispersing agent, a lubricant, an antistatic agent, etc., may be adsorbed on the surface thereof by impregnating the ferromagnetic powder with the additive in a solvent as described later.

As iron oxide series powders which are used as the ferromagnetic powders in this invention, cobalt-containing iron oxide is preferred and it is known that by using the Co-containing iron oxide containing from 1 to 15% by weight of divalent iron based on the weight of trivalent iron, a magnetic recording medium having an excellent running durability and excellent signal/noise can be obtained. If the content of divalent iron is less than 1% by weight, it is unfavorable for S/N and if the content thereof is over 15% by weight, the binding power between the ferromagnetic powder and the binder is deteriorated, which is undesirable for running durability.

Also, an alloy powder which is used as the ferromagnetic powder in this invention is a ferromagentic alloy powder containing iron, cobalt or nickel and when a ferromagnetic alloy powder having a specific area of at least 35 $m^2/g$ is used as the ferromagnetic powder, the effect thereof is remarkable.

Examples of the ferromagnetic alloy powder are alloy powders containing at least 75% by weight of a metallic component, wherein at least 80% by weight of the metallic component is at least one kind of ferromagnetic iron or alloy (e.g., Fe, Co, Ni, Fe-Co, Fe-Ni, Co-Ni, and Co-Ni-Fe), and less than 20% by weight of the metallic component is other component(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P). Iron nitride powders may also be used.

Also, the aforesaid ferromagnetic metal or alloy may contain a small amount of water, a hydroxide, or an oxide.

The production processes of these ferromagnetic metal powders are already known and the ferromagnetic alloy powder which is a typical example of the ferromagnetic powder for use in this invention can be produced by these known processes.

That is, as examples of the production process of the ferromagnetic alloy powder for use in this invention, there are following methods:

(a) Method of reducing a composite organic acid salt (mainly, an oxalate) with a reducing gas such as hydrogen, etc.

(b) Method of obtaining Fe particles or Fe-Co particles by reducing iron oxide with a reducing gas such as hydrogen.

(c) Method of thermally decomposing a metal carbonyl compound.

(d) Method of reducing a ferromagnetic metal composition by adding a reducing agent such as sodium hydrogenborate, a hypophosphite, hydrazine, etc., to an aqueous solution of the ferromagnetic metal compound.

(e) Method of electrolytically depositing a ferromagnetic metal powder using a mercury cathode and then separating mercury therefrom.

(f) Method of obtaining a ferromagnetic metal fine powder by evaporating the metal in an inert gas at low pressure.

In the case of using a ferromagnetic alloy powder, there is no particular restriction on the form but usually an acicular form, a granular form, a die form, a rice grain form, or a tabular form is used.

The specific area (S BET) of the ferromagnetic alloy powder is preferably at least 40 $m^2/g$, and more preferably at least 45 $m^2/g$.

As the binder which is used for the magnetic layer and the back layer of the magnetic recording medium of this invention, conventionally known thermoplastic resins, thermosetting resins, reactive resins, and a mixture of them are used.

The thermoplastic resin which is used in this invention has a softening temperature of not higher than 50° C., an average molecular weight of 10,000 to 300,000, and a polymerization degree of from about 50 to 2,000. Examples include a vinyl chloride-vinyl acetate copolymer, a vinyl chloride polymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene copolymer, a methacrylic acid ester-styrene copolymer, a urethane elastomer, a nylon silicone series resin, a nitrocellulose-polyamide resin, polyvinyl fluoride, a vinylidene-acrylonirtile copolymer, a butadiene-acrylonitrile copolymer, a polyamide resin, polyvinyl butyral, cellulose derivatives (cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, acetyl cellulose, etc.), a styrene-butadiene copolymer, a polyester resin, a chlorovinyl ether-acrylic acid copolymer, an amino resin, various synthetic rubber series thermoplastic resins, and mixtures of them.

The thermosetting resin or the reactive resin for use in this invention has molecular weight of less than 200,000 in a state of coating composition and by heating after coating and drying, the molecular weight become almost infinite by causing a condensation reaction, an addition reaction, etc. Also, in these resins, the resin which does not soften or melt until being thermally decomposed is preferred.

Specific examples of these resins are a phenol resin, a phenoxy resin, an epoxy resin, a polyurethane curing type resin, a urea resin, a melamine resin, an alkyd resin, a silicone resin, an acrylic reactive resin, an epoxy polyamide resin, a nitrocellulose-melamine resin, a mixture of a high molecular weight polyester resin and an isocyanate prepolymer, a mixture of a methacrylate copolymer and a diisocyanate prepolymer, a mixture of polyester polyol and a polyisocyanate, a urea-formaldehyde resin, a mixture of a low molecular weight glycol, a high molecular weight diol, and triphenylmethane triisocyanate, a polyamine resin, a polyimine resin, and mixtures of them.

In these resins, vinyl chloride series resins, polyurethane series resins or polyisocyanate are particularly preferred.

It is preferred that these thermoplastic resins, thermosetting resins, and reactive resins each has, in addition to the main functional group (s), from 1 to 6 kinds of acid groups (these acid groups may be in the forms of sodium salts, etc.), such as carboxylic acid, sulfinic acid, sulfenic acid, sulfonic acid, sulfuric acid, phosphoric acid, phosphone, phosphine, boric acid, a sulfuric acid ester group, a phosphoric ester group, the alkylester groups of them, etc., amino acids; aminosulfonic acids; aminoalcohol sulfuric acid or phosphoric acid esters; amphoteric groups such as alkylbetaine type groups, etc.; an amino group, an imino group, an imido group, an amido group, an epoxy group, a hydroxy group, an alkoxy group, a thiol group, a halogen atom, a silyl group, a silokane group, etc.; as functional groups each at from $1 \times 10^{-6}$ eq to $1 \times 10^{-2}$ eq per gram of the resin.

As the polyisocyanate which is used for a binder in this invention, there are isocyanates such as trylenediisocyanate, 4,4'-diphenylmethanediisocyanate, hexamethylene diisocyanate, xylylene diisocyanate, naphthylene-1,5-diisocyanate, o-toluidine isocyanate, isohorone diisocyanate, triphenylmethane triisocyanate, etc., reaction products of the aforesaid isocyanates and polyalcohols, and polyisocyanates of from dimer to pentadecamer formed by the condensation of the aforesaid isocyanates, etc. The mean molecular weight of these polyisocyanates is preferably from 100 to 20,000.

These polyisocyanates are also commercially availably as trade names of Colonate L, Colonate HL, Colonate 2030, Colonate 2031, Millionate MR, and Millionate MYL (trade names, made by Nippon Polyurethane K.K.), Takenate D0102, Takenate D-110N, Takenate D-200, Takenate D-202, Takenate 300S, and Takenate 500 (trade names, made by Takeda Chemical Industries, Ltd.), Sumidur T-80, Sumidur 44S, Sumidur PE, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (trade names, made by Sumitomno Bayer Co.). They can be used singly or as a combination of then by utilizing the difference in curing reactivity thereof.

Also, for accelerating the curing reaction, a compound having a hydroxy group (butanediol, hexanedial, polyurethane having a molecular weight of from 1000 to 10,000, water, etc.) and an amino group (monomethylamine, dimethylamine, trimethylamine, etc.) or a metal oxide catalyst can be used together.

The aforesaid compound having a hydroxy group or an amino group is preferably a polyfunctional compound.

The aforesaid polyisocyanate is preferably used in an amount of from 5 to 40% by weight of the total amount of the binders.

The aforesaid binders are used singly or as a combination of them and additives are added thereto.

As to the mixing ratio of the ferromagentic powder and the binder in the magnetic layer, the binder is used in the range of from 5 to 300 parts by weight per 100 parts by weight of the ferromagnetic powder.

As to the mixing ratio of the fine powders and the binder in the back layer, the binder is used in the range of from 30 to 300 parts by weight per 100 parts by weight of the fine powder(s).

As the additives, there are a dispersing agent, a lubricant, an abrasive, an antistatic agent, an antioxidant, a solvent, etc.

As the dispersing agent for use in this invention, there are fatty acids ($R^1COOH$, wherein R1 represents an alkyl group) having from 10 to 50 carbon atoms, and preferably from 10 to 26 carbon atoms, such as caprylic acid, capric acid, lauric acid, myrystic acid, palmitic acid, stearic acid, behenic acid, oleic acid, elaidic acid, linoleic acid, linolenic, stearolic acid, etc.; metal soaps composed of the aforesaid fatty acids and an alkali metal (Li, Na, K, $NH^{4+}$, etc.,), an alkaline earth metal (Mg, Ca, Ba, etc.), Cu, Pb, etc.; fatty acid amides of the aforesaid fatty acids; recuthine, etc.

Furthermore, higher alcohols having 4 or more carbon atoms, such as butanol, octyl alcohol, mirystyl alcohol, stearyl alcohol, etc., and the sulfuric acid esters, phosphoric acid esters, amine compounds, etc., of these alcohols can be used as the dispersing agents.

Still further, polyalkylene oxide, the sulfuric acid esters, phosphoric acid esters, amine compounds, etc., of polyalkylene oxide, sulfosuccinic acid, sulfosuccinic acid esters, etc., can be also used as the dispersing agent.

Into the aforesaid compounds can be introduced a substituent such as Si or F for changing the compatibility with a binder and the characters thereof.

These dispersing agents can be usually used singly or as a mixture of two or more kinds and the dispersing agent is added to a binder in the range of from 0.005 to 20 parts by weight per 100 parts by weight of the binder.

At use of the dispersing agent, the agent may be previously coated on the surfaces of ferromagnetic powders or non-magnetic powders or may be added to a binder during dispersing a ferromagnetic powder in the binder solution.

Details of the dispersing agents and the using method are described, e.g., in JP-B-39-28369, JP-B-4323889, JP-B-44-17945, JP-B-44-18221, JP-B-49-39402, JP-B-48-15001, U.S. Pat. Nos. 3,387,993 and 3,470,021.

As other preferred compounds as the dispersing agent, there are surface active agents such as carboxylic acids, phosphoric acid esters, etc., and fluorine series surface active agents Fluorad FC95, FC129, FC430, and FC431 (trade names, made by 3M).

As the lubricant and antioxidant which are used for the magnetic layer and the back layer in this invention, there are fine powders of inorganic materials such as molybdenum disulfide, boron nitride, graphite, fluorinated graphite, calcium carbonate, barium sulfate, silicon oxide, titanium oxide, zinc oxide, tin oxide, tungsten disulfide, etc.; resin fine powders, such as an acrylstyrene series resin fine powder, a benzoguanamine series fine powder, a melamine series resin fine powder, a polyolefin series resin powder, a polyester series fine powder, a polyamide series fine powder, polyimide series fine powder, a polyethylene fluoride series resin fine powder, etc.; and organic lubricants such as silicone oils, fatty acid-modified silicone oils, fluorinated alcohols, polyolefins (polyethylene wax, etc.), polyglycols (polyethylene oxide wax, tetrafluoroethylene oxide wax, polytetrafluoroglycol, etc.), perfluorofatty acids, perfluorofatty acid esters, perfluoroalkylsulfuric acid esters, perfluoroalkylphosphoric acid esters, alkylphosphoric acid esters, polyphenyl ethers, and fatty acid esters of monobasic fatty acids having from 10 to 50 carbon atoms and preferably from 10 to 35 carbon atoms and one or more of a monohydric to hexahydric alcohol each having from 3 to 50 and preferably from 3 to 30 carbon atoms.

Also, fatty acids having from 8 to 50 and preferably from 8 to 22 carbon atoms. Fatty acid amides, and aliphatic alcohols can be also used as the lubricant.

Specific examples of the organic lubricant are butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosurbitane monostearate, anhydrosorbitane distearate, anhydrosorbitane tristearate, anhydrosorbitane tetrastearate, anhydrosorbitane ethyleneoxide monostearate, oleyl oleate, oleyl alcohol, and lauryl alcohol. They can be used singly or as a combination thereof.

Of these organic lubricants, high fatty acid esters having 24 or more carbon atoms are preferably used in this invention, Particularly preferred are those represented by formula (I)

$$R^2COOR^3 \quad (I)$$

wherein $R^2$ represents a hydrocarbon group having from 14 to 35 carbon atoms, preferably an aliphatic hydrocarbon group, and more preferably a straight chain alkyl group (e.g., octadecyl, hexadecyl, tetradecyl, heptadecyl, nanodecyl, tetracosyl, hexacosyl, octacosyl, etc.), and $R^3$ represents a hydrocarbon group having from 4 to 30 carbon atoms, preferably an aliphatric hydrocarbon group and more preferably a branched chain alkyl group (e.g., isohexyl, isoheptyl, isotridecyl, 2-ethylhexyl, 2-butyloctyl, 2-hexyldecyl, 2-octyldodecyl, 2-decyltetradecyl, etc.), provided that the total carbon atoms of $R^2$ and $R^3$ is 23 or more and preferably from 23 to 34.

The organic lubricant may be added in a magnetic layer any time during and/or after the formation of magnetic layer, or even after the contact-rubbing treatment of this invention.

The lubricant is added in the total amount of from 0.05 to 20 parts by weight per 100 parts by weight of the binder.

Also, so-called lubricant oil additives can be used singly or as a combination thereof as a lubricant in this invention. Examples of these additives are antioxidants (alkylphenol, etc.), rust preventives (naphthenic acid, alkenylsuccinic acid, dilauryl phosphate, etc.), oily agents (rapeseed oil, lauryl alcohol, etc.), extreme pressure agents (dibenzyl sulfide, tricresyl phosphate, tributyl phosphite, etc.), clean dispersing agents, viscosity index improving agents, pour point depressants, and anifoaming agents.

As the antistatic agent for use in this invention, there are electrically conductive powders of graphite, carbon black, a carbon black polymer, tin oxide-antimony oxide, tin oxide, titanium oxide-tin oxide-antimony oxide, etc.; natural surface active agents such as saponin, etc.; nonionic surface active agents such as alkylene oxide series surface active agents, glycerol series surface active agents, glycidol series surface active agents, polyhydric alcohols, polyhydric alcohol esters, alkylphenolethylene oxide addition products, etc.; cationic surface active agents higher alkylamines, cyclic amines, hydatoin derivatives, amidoamine, esteramides, quaternary ammonium salts, heterocyclics (pyridine, etc.), phosphoniums, sulfoniums, etc.; anionic surface active agents containing an acid group such as carboxylic acids, sulfonic acid, phosphoric acid, a sulfuric acid ester group, a phosphoric acid ester group, etc.; amino acids; and amphoteric surface active agents such as amino acids, aminosulfonic acids, sulfuric acid or phosphoric acid esters of aminoalcohol, alkylbetaine type surface active agents, etc.

These surface active agents may be used singly or as a mixture thereof.

Also, the surface active agent may be formed on the surface of the magnetic recording medium as an overcoat at a coverage of from 1 mg/m² to 550 mg/m².

The amount of the surface active agent for the magnetic recording medium is from 0.01 to 10 parts by weight per 100 parts by weight of the ferromagnetic fine powder.

The surface active agents are usually used as an antistatic agent but are sometimes used for other purposes such as for the improvement of dispersibility and magnetic characteristics, the improvement of the lubricity, or as a coating aid.

As carbon black for use in this invention, there are furnace black for rubber, thermal black for rubber, carbon black for color, acetylene black, etc.

Practical examples of abbreviates for the carbon blacks in the United States are SAF, ISAF, IISAF, T, HAF, SPF, FF, FEF, HMF, GPF, APF, SRF, MPF, ECF, SCF, CF, FT, MT, HCC, HCF, MCF, LFF, RCF, etc., and those classified into D-1765-82a of the ASTM standard in the United States can be used.

The mean particle size of the carbon black for use in this invention is from 5 to 1,000 mμ (electron microscope), the specific surface area by a nitrogen adsorption method is from 1 to 1,500 m²/g, pH thereof is from 2 to 13 (by the method of JIS standard K-6221-1982), and dibutyl phthalate (DBP) oil absorption is from 5 to 2,000 ml/100 g (by the method of JIS standard K-6221-1982).

Also, the water content of the carbon black for use in this invention is from 0.00 to 20% by weight.

For the purpose of reducing the surface electric resistance of the coated layer, carbon black having sizes of from 5 to 100 mμ is used and for controlling the strength of the coating layer, carbon black having sizes of from 50 to 1,000 mμ is used. Furthermore, for smoothing the surface of the coated layer for reducing spacing loss, carbon black of fine particle sizes (less than 100 mμ) is used and for roughening the surface of the coated layer for reducing the friction coefficient, carbon black of coarse particle sizes (larger than 50 mμ) is used.

As described above, the kind and the addition amount of carbon black are selected according to the purposes required for the magnetic recording medium.

Also, these carbon blacks may be surface treated by a dispersing agent as described above or may be grafted with a resin. Also, carbon black a part of the surface of which is graphitized by producing the carbon black in a furnace having a treating temperature of 2,000° C. or higher can be used. Furthermore, hollow carbon black can be also used as specific carbon black in this invention.

When carbon black is used for the magnetic layer, it is desirable that the carbon black is used in the range of from 0.1 to 20 parts by weight per 100 parts by weight of the ferromagnetic fine powder.

The carbon black which can be used in this invention and the properties thereof can refer to the descriptions of, e.g., Carbon Black Handbook, edited by Carbon Black Society, published in 1971).

As abrasives which are used for the magnetic layer and the back layer in this invention, there are materials having a polishing action or an abrasive action, such as γ-alumina, α-alumina, α-γ-alumina, fused alumina, silicon carbide, chromium oxide, cerium oxide, corundom, artificial diamond, o-iron oxide, garnet, emery (main components: corundum and magnetite), silica, silicon nitride, boron nitride, molybdenum carbide, boron carbide, tungsten carbide, titanium carbide, quartz, tripoli, diatomaceous earth, dolomite, etc. That is, the aforesaid materials having a Mohs' hardness of at least 6, and preferably at least 8 are used singly or a combination of from 2 to 4 kinds thereof. The mean grain size of the abrasives is from 0.005 to 5 μm, and particularly preferably from 0.01 to 2 μm. The abrasive is added in the range of from 0.01 to 20 parts by weight per 100 parts by weight of the binder.

Then, the production process of this invention is described.

As an organic solvent which is used for dispersing, kneading, and coating the aforesaid components in the process of this invention, there are ketones such as acetone, methyl ethyl ketone, methyl isobutyl ketone, cyclohexanone, isophorone, tetrahydrofuran, etc.; alcohols such as methanol, ethanol, propanol, butanol, isobutyl alcohol, isopropyl alcohol, methylcyclohexanol, etc.; esters such as methyl acetate, ethyl acetate, butyl acetate, isobutyl acetate, isopropyl acetate, ethyl lactate, acetic acid glycol monoethyl ether, etc.; ethers such as diethyl ether, tetrahydroforan, glycol dimethyl ether, glycol monoethyl ether, dioxane, etc.; tars (aromatic hydrocarbons) such as benzene, toluene, xylene, cresol, chlorobenzene, styrene, etc.; chlorinated hydrohydrocarbons such as methylene chloride, ethylene chloride, carbon tetrachloride, chloroform, ethylenechlorohydrin, dichlorobenzene, etc.; N,N-dimethylformaldehyde, hexane, etc.

There is no particular restriction on the dispersion and kneading methods and also the addition order of the components can be properly selected.

For the preparation of the coating compositions for the magnetic layer and the back layer in this invention, ordinary kneaders such as a double roll mill, a triple roll mill, a ball mill, a pebble mill, a trommel, a sand grinder, Szegvari, an attritor, an high-speed impeller, a dispersing machine, a high-speed stone mill, a high-speed impact mill, a disper, a kneader, a high-speed mixer, a ribbon blender, a co-kneader, an intensive mixer, a tumbler, a disperser, a homogenizer, a single-axis screw extruder, a double-axis screw extruder, and a supersonic dispersing machine.

Details of the techniques on kneading and dispersing are described in T. C. Patton, *Paint Flow and Pigment Dispersion*, published by John Wiley & Sons Co., 1964, Sinichi Tanaka, *Kogyo Zairyo (Industrial Materials)*, Vol. 25, 37 (1977), and literatures cited in the aforesaid books.

For continuous treatment, the aforesaid kneading and dispersing machines are properly combined to prepare and coat the coating compositions.

These techniques are also described in U.S. Pat. Nos. 2,581,414 and 2,855,156.

In this invention, the coating compositions for the magnetic layer and the back layer can be also prepared by kneading and dispersing the components according to the methods described in the aforesaid books and cited literatures cited therein.

For the formation of the magnetic recording layer, the aforesaid components are dissolved and dispersed in an organic solvent to form a coating composition and the composition is coated on a support and dried.

When the magnetic recording medium is used as a tape, the thickness of the support is from about 2.5 to 100 μm, and preferably from 3 to 70 μm. When the magnetic recording medium is used as a disk or a card, the thickness of the support is from about 0.03 to 10 mm. In the case of drum, a cylindrical support may be used.

As the material for the support, there are polyesters such as polyethylene terephthalate, polyethylene naphthalate, etc.; polyolefins such as polypropylene, polyethylene, etc.; cellulose derivatives such as cellulose triacetate, cellulose diacetate, etc.; vinylic resins such as polyvinyl chloride, polyvinylidene chloride, etc.; plastics such as polycarbonate, polyamide, polysulfone, etc., metals such as copper, etc., and ceramics such as glass, etc.

Before coating, the support may be subjected to a carona discharging treatment, a plasma treatment, a subbing treatment, a heat treatment, a dust removing treatment, a metal vapor deposition treatment, or an alkali treatment.

These supports are described, e.g., in West German Patent No. 3,338,854A, JP-A-59-116926, U.S. Pat. No. 4,388,368, and Yukio Mitsuishi, *Sen-i to Kogyo (Fibers and Industry)*, Vol. 31, pages 50–55, 1975.

For coating the coating compositions for the magnetic recording layer and the back layer on a support, an air doctor coating method, a blade coating method, a sequeeze coating, a dip coating method, a reverse roll coating method, a transfer roll coating method, a gravure coating method, a kis coating method, a cast coating method, a spray coating method, a bar coating method, etc., can be utilized. These and other methods which can be also employed in this invention are described in *Coating Koqaku (Engineering)*, pages 253-277 (published by Asakura Shoten, 1971).

The magnetic layer coated on a support by the aforesaid method is, after, if necessary, applying an orientation treatment to the ferromagentic powders in the layer to a desired direction while drying the layer, dried. In this case, the traveling speed of the support is usually from 10 meters/min. to 1000 meters/min., and the drying temperature is from 20° C. to 130° C. Then, the coated layer is subjected to a surface smoothing treatment (calender treatment) and cut into a desired form to provide the magnetic recording medium of this invention.

It is preferred that the calendering treatment is conducted using a 5 or 7 stage super calender apparatus (shown, e.g., in JP-A-51-10340 and JP-A-60-38120). If necessary, the aforesaid steps may be conducted in several steps.

Also, as a cleaning step, a surface contact cleaning with a tissue paper, a cloth, or a whetstone can be applied. Cutting and setting of the product may be performed with the production step for the magnetic recording medium. As the tissue and cloth, non-woven cloth or a microfiber cloth(e.g., "Toraysee", trade name, made by Toray Industries, Inc.) is preferred.

In the production of the magnetic recording medium, the steps of surface treatment of fillers, kneading, dispersing, coating, heat treatment, calendering, EB treatment, surface polishing treatment, and cutting are preferably performed continuously.

In these steps, the temperature and humidity are controlled. That is, the temperature is from 10° C. to 130° C. and the humidity of from 5 mg/m$^2$ to 20 mg/m$^2$ as the water content in air. These conditions are shown in JP-B-40-23625, JP-B-39-28368, and U.S. Pat. No. 3,473,960. Also, the method shown in JP-B-41-13181 is a fundamental and important technique in the field of the art, and can be employed in this invention.

In this invention, the aforesaid contact-rubbing treatment can be performed any time after the formation of magnetic layer but preferably after the orientation treatment and the calendering treatment. More specifically, when a calender treatment is employed in the production process of the magnetic recording medium, the contact-rubbing treatment may be practiced after the calender treatment and when a calender treatment, is not employed, the contact-rubbing treatment may be applied after coating, or in the case of magnetic tape, before or after slitting, before winding, or before setting in a cassette. Also, it is preferable that the tape is cleaned in face contact with a tissue paper or a cloth at the position between the outlet of the rubbing section and a reel or a hub of winding the tape.

In the case of using an iron oxide powder having an acicular ratio of from 2/1 to 20/1 as a ferromagnetic powder, the contact-rubbing treatment is preferably performed to increase a ratio of the numbers of diffraction points N(220)/N(113) of the ferromagnetic fine powders at the surface of the magnetic layer measured by a high-speed reflection electron diffraction, to at least 1.65, whereby the head abrasion can be effectively reduced, staining of the head is prevented, the occurrence of drop out is reduced, and the still image durability (still life) characteristics can be improved.

This preferred embodiment of the present invention is explained in detail below.

The ratio of the numbers of diffraction points from the ferromagentic powder by a high-speed reflection electron diffraction, i.e., N(220)/N(113), of less than 1.65 is considered to show that the acicular crystals of the ferromagnetic powders at the surface of the magnetic layer predominantly direct the perpendicular direction to the surface of the magnetic layer. Also this configuration is considered to be advantageous in view of the binding effect of the binder components and the coefficient of friction since the extreme (highest) points of the acicular crystals are exposed onto the surface of the magnetic layer.

The inventor has further investigated on the magnetic recording medium having more excellent head abrasive characteristics, head cleaning characteristics, and drop out characteristics while retaining good running durability characteristics and signal/noise characteristics.

As the result thereof, it has been found that by bringing the surface of the magnetic layer containing an acicular iron oxide powder into contact with a carbon steel alloy or super hard alloy made from powders having a Mohs' hardness of at least 6 and rubbing the surface with the alloy, to increase the ratio N(220)/N(113) from less than 1.65 to 1.65 or higher, preferably 1.70 or higher, a magnetic recording medium having excellent head abrasive characteristics, head cleaning characteristics, and drop out characteristics can be obtained.

The ratio N(220)/N(113) can prescribe the plane orientation of the acicular crystals at the surface of the magnetic layer, and that the ratio of less than 1.65 shows that the acicular crystals at the surface of the magnetic layer stand in the more perpendicular direction to the surface of the magnetic layer. In addition, N(220) means the plane at the long axis side of an acicular ferromagnetic fine powder (crystal) and N(113) means the plate at the short axis side.

Accordingly, a large value of N(220) means that there are many planes at the long axis side of acicular ferromagnetic fine powders at the surface of the magnetic layer and that many ferromagnetic powders are oriented to the plane direction of the surface of the magnetic layer. Also a large value of N(113) means that there are many planes at the short axis side of acicular ferromagnetic powders at the surface of the magnetic layer and that many ferromagnetic powders are oriented to the perpendicular direction to the surface of the magnetic layer.

The point of N(220)/N(113)=1.65 is the point at which properties of the magnetic recording medium significantly change. That is, the value larger than 1.65 shows that there are less N(220) planes and that the ferromagnetic powders are predominantly oriented to the plane direction, i.e., lie down, and the value less than 1.65 shows that there are less N(220) planes and that the ferromagnetic powders are oriented in the perpendicular direction to the surface of the magnetic layer, i.e., stand.

When acicular ferromagnetic powders lie down, the squareness ratio is increased and the output is improved. However, in this case, the binding power of the ferromagnetic powder with a binder is weak and the strength of the magnetic layer is insufficient. On the other hand, if acicular ferromagnetic powders stand, the squareness ratio is lowered and the output becomes low, but the binding power of the ferromagnetic powders with a binder becomes strong and the strength of the magnetic layer is increased.

The surface of the magnetic layer exhibiting the ratio N(220)/N(113) of less than 1.65 is subjected to the contact-rubbing treatment of this invention to increase N(220)/N(113) above 1.65. The reason why the ratio N(220(/N(113) is increased by the contact-rubbing treatment is not yet clear but it is believed because the ferromagnetic powders standing on the surface of the magnetic layer are ground or extracted from the surface.

The magnetic recording medium having the magnetic layer of the aforesaid ratio N(220)/N(113) being less than 1.65 can be prepared as follows.

Directly after coating a dispersion of a ferromagnetic powder on a non-magnetic support such as a polyethylene terephthalate film, the ferromagnetic power is oriented to the longitudinal direction by means of permanent magnets. In this case, a selenoid magnet may be used as the magnet. Also, a permanent magnet may be used with a solenoid magnet. Alternatively, the orientation operation may be applied to a support directly after coating the dispersion of a ferromagnetic powder while applying thereto drying air of from 20° C. to 130° C. and preferably from 50° to 100° C. The intensity of the magnetic field is preferably from 700 to 4,000 Gauss and more preferably from 1,500 to 4,000 Gauss, and the traveling speed of the coated film is preferably from 10 to 1,000 m/min and more preferably from 100 to 800 m/min.

The ratio N(220)/N(113) increases when the orientation is strongly applied, and it decreases when the orientation is weakly applied.

The residence time of the orientation is preferably shorter than 5 seconds.

In the embodiment using an acicular iron oxide powder as a ferromagnetic powder, it is preferred that a magnetic layer having the following relationship be subjected to the contact-rubbing treatment:

$$Y < 1.65$$

$$0.8 \leq X \leq 1.0$$

$$Y = 6.24165X - 3.7922 \pm 0.1837$$

that is, $$-3.9759 < Y - 6.24165X < -3.6085$$

wherein Y represents the ratio N(220)/N(113) and X represents the squareness ratio of the magnetic layer measured at a magnetic field Hm of 2 KOe.

In the case of using other ferromagnetic powders such as metal powders and alloy powders, the surface condition of the magnetic layer which is preferably subjected to the contact-rubbing treatment cannot be defined in terms of the ratio N(220)/N(113). However, even if this is the case, a magnetic recording medium having excellent head abrasive characteristics, head clearing characteristics and drop out characteristics can be obtained by subjecting a magnetic layer having the squareness ratio of 0.8 or more to the contact-rubbing treatment of this invention.

In this invention, the surface of a magnetic recording medium having a high squareness ratio and a high smoothness capable of showing sufficient electromagnetic properties is brought into contact with the aforesaid carbon steel alloy or super hard alloy and rubbed, whereby the head abrasion in initial tape running is greatly reduced, the occurrence of head clogging is prevented, and the RF output can be improved.

In a preferred relationship between the squareness ratio and the surface roughness, the squareness ratio is at least 0.84 and the surface roughness Ra is less than 0.02 $\mu$m. Also, it is preferred that the surface of the magnetic layer having a squareness ratio of at least 0.80 and Ra of less than 0.008 $\mu$m is brought into contact with the carbon steel alloy or super hard alloy and rubbed thereby. This shows that when Ra is very small and the magnetic layer is smooth, the squareness ratio may be slightly low, and on the other hand, when the squareness ratio is high, Ra may be large to some extent.

When the squareness ratio of the magnetic recording medium is 0.80 or more, the remarkable effect is obtained. The measuring magnetic field Hm for the squareness ratio is 2 KOe. The surface roughness Ra is preferably less than 0.02 $\mu$m with cut off of 0.25 mm.

When the squareness ratio of the magnetic recording medium is 0.80 or more, the RF output is increased but the abraded amount of the magnetic head is increased. Lowering of the squareness ratio is undesirable since in this case, the output is deteriorated. Also, when the surface roughness (Ra) is reduced, the contact property of the magnetic recording medium with a magnetic head becomes better to reduce the noise components but $\mu$ value is increased and the abraded amount of head is increased.

However, by applying the aforesaid contact-rubbing treatment, the abraded amount of head can be greatly reduced.

The phenomenon occurring at the contact and rubbing with the carbon steel alloy or super hard alloy has not yet been clarified but is considered to be as follows.

That is, it is considered that when the carbon steel alloy is used, the ferromagnetic powders in the perpendicular direction to the surface of the magnetic layer are abraded not only by the powders of the carbon steel alloy which is abraded by abrasive particles in the magnetic layer, but also by the powders formed upon rubbing of the ferromagnetic powders with the carbon steel alloy. In the case of using the super hard alloy, the ferromagnetic powders in the direction perpendicular to the surface of the magnetic layer are ground by the grinding property of the particles of tungsten carbide, etc., constituting the super hard alloy and abrasion is also accelerated by the ground powder, whereby the extreme points of the ferromagnetic powders in a perpendicular direction to the surface of the magnetic layer are abraded and the ferromagnetic powders are extracted from the surface.

The invention is explained in detail with reference to the following examples. However, this invention should not be constructed as being limited thereto. In the examples, the "parts" are "by weight".

EXAMPLES 1 TO 7 AND COMPARISON EXAMPLES 1 TO 8

A magnetic coating composition was prepared by placing magnetic layer composition [I] shown below in a kneader followed by sufficiently kneading, adding composition [II] shown below to the mixture followed by sufficiently kneading, and then dispersing composition ]III] in the kneaded mixture.

| Magnetic layer composition: | |
|---|---|
| [I]: | |
| Co-containing $\gamma\text{-}Fe_2O_3$ powder (nitrogen adsorption specific surface | 300 parts |

-continued

| Magnetic layer composition: | |
|---|---|
| area 45 m²/g, Fe⁺⁺ = 4 atom %, Hc 750 Oe, acicular ratio 6/1) | |
| Vinyl chloride resin (MR110, trade name, made by Nippon Zeon K.K.) | 25 parts |
| Polyurethane resin (UR 8600, trade name, made by Toyobo Co., Ltd.) | 20 parts |
| Carbon black (Mitsubishi 950B, trade name, made by Mitsubishi Kasei Corporation, mean grain size 10 n.m.) | 12 parts |
| Abrasive γ-Al₂O₃ (UA5600, trade name, made by Showa Denko K.K. | 15 parts |
| Oleic acid | 3 parts |
| Cyclohexanone | 150 parts |
| [II]: | |
| Butyl acetate | 850 parts |
| tert-Butyl stearate | 3 parts |
| [III]: | |
| Polyisocyanate (Colonate 3040, trade name, made by Bayer A.G.) | 20 parts |
| Stearic acid | 3 parts |
| Methyl ethyl ketone | 100 parts |

After adjusting the viscosity of the magnetic coating composition, the composition was coated on a 18 μm-thick polyethylene terephthalate film (non-magnetic support) at a dry thickness of 5.0 μm. The coated film was subjected to an orientation treatment in the longitudinal direction using a magnet of 3,000 Gausses, dried, and then calendered to form a magnetic layer.

Then, a coating composition for a back layer was prepared by kneading and dispersing back layer composition [I] shown below in a ball mill and adding thereto composition [II] shown below followed by mixing with stirring and coated on the back surface of the support at a dry thickness of 2.0 μm and dried to form a back layer.

| Back layer composition: | |
|---|---|
| [I]: | |
| Carbon black (Can carb MTCI, trade name, made by Can carb Co., nitrogen adsorption specific surface area 10 m²/g. mean grain size 250 n.m.) | 30 parts |
| Carbon black (Mitsubishi 3250B, trade name, made by Mitsubishi Kasei Corporation, nitroen absorption specific are 160 m²/g, mean grain size 30 n.m.) | 70 parts |
| Polyurethane polycarbonate (FJ2, trade name, made by Dainichiseika Color & Chemicals Mfg. Co., Ltd.) | 30 parts |
| Phenoxy resin (PKHH, trade name, made by Union Carbide Co.) | 20 parts |
| Methyl ethyl ketone | 700 parts |
| Cyclohexanone | 300 parts |
| [II]: | |
| Polyisocyanate (Colonate 3040, trade name, made by Nippon Polyurethane K.K.) | 10 parts |
| Lubricant (Silicone KF69, trade name, made by Shin-Etsu Chemical Co., Ltd.) | 0.1 part |
| Lubricant (oleic acid) | 1 part |
| Methyl ethyl ketone | 100 parts |

Then, the magnetic recording medium thus prepared was slit into 1 inch width to provide a video tape having the ratio N(220)/N(113) of 1.60.

The surface of the video tape was brought into contact with a material shown in Table 1 at two positions under the condition also shown in Table 1, and rubbed once with the material. The contact incident angle was 45 degree, the pushing-down extent was 7 mm and the rubbing (sliding) speed was 300 meters/min.

The properties of the thus obtained sample obtained are shown in Table 2 below. The evaluation methods for the tape were as follows.

Evaluation Method

Head Abrasion

In a high humidity condition (25° C., 70% RH), repeated running of 20 passes was conducted using BVH 2180 VTR, made by Sony Corporation and the abraded amount of the VTR head was measured.

Head Staining

When measuring the abraded amount of the head, the stained state of the head was observed and the head cleaning characteristics were evaluated in the three levels:

A; no stain at the running inlet and outlet portions of the head,
B; slightly stained at the inlet and outlet portions, and
C; stained at the inlet and outlet portions.

Drop out

In the condition of 25° C., 70% RH, the recording and reproduction were simultaneously conducted using BVH 2000 VTR, made by Sony Corporation and the number of drop out per one minute was measured for 60 minutes by means of a drop out counter made by Shibasoku K. K.

Still Durability

As the evaluation of the running durability, reproduction was conducted in still mode using BVH 2000 VTR under the condition of 25° C., 70% RH, with applying a load of 200 g to the tape, and the time that the video output decreased to −16 dB was measured.

TABLE 1

| Example No. | Material* | Tape Tension (g) | Contact Area with Material |
|---|---|---|---|
| 1 | WC (9) | 100 | 0.12 mm × 1 inch |
| 2 | " | 100 | 5.20 mm × 1 inch |
| 3 | " | 50 | 0.12 mm × 1 inch |
| 4 | " | 200 | 0.12 mm × 1 inch |
| 5 | Steel | 100 | 0.80 mm × 1 inch |
| 6 | " | 100 | 1.60 mm × 1 inch |
| 7 | TiC (9-10) | 100 | 0.12 mm × 1 inch |
| Comp. Ex. | | | |
| 1 | Sapphire (9) | 100 | 0.05 mm × 1 inch |
| 2 | " | 100 | 0.60 mm × 1 inch |
| 3 | " | 300 | 0.12 mm × 1 inch |
| 4 | " | 300 | 0.40 mm × 1 inch |
| 5 | Quartz (6.5) | 100 | 0.12 mm × 1 inch |
| 6 | " | 300 | 0.12 mm × 1 inch |
| 7 | Zr-Ceramic (8) | 100 | 0.12 mm × 1 inch |
| 8 | None | — | — |

*Mohs' hardness of the material is indicated in "( )".

TABLE 2

| Example No. | N(220)/N(113) | Head Abrasion (100 hours Conversion) (μm) | Head Staining | Number of Drop Out | Still Durability |
|---|---|---|---|---|---|
| 1 | 1.82 | 16 | A | 7 | >120 min. |
| 2 | 1.78 | 42 | A | 7 | " |
| 3 | 1.70 | 22 | A | 5 | " |
| 4 | 1.85 | 10 | A | 5 | " |
| 5 | 1.72 | 38 | A | 6 | " |
| 6 | 1.81 | 42 | A | 9 | " |
| 7 | 1.73 | 18 | A | 8 | " |
| Comp. Ex. 1 | 1.61 | 80 | A | 18 | >120 min. |
| Comp. Ex. 2 | 1.60 | 108 | B | 11 | " |
| Comp. Ex. 3 | 1.62 | 84 | A | 13 | " |
| Comp. Ex. 4 | 1.62 | 76 | B | 16 | " |
| Comp. Ex. 5 | 1.59 | 90 | A | 15 | " |
| Comp. Ex. 6 | 1.59 | 80 | B | 18 | " |
| Comp. Ex. 7 | 1.64 | 58 | A | 12 | " |
| Comp. Ex. 8 | 1.60 | 110 | C | 32 | " |

As is clear from the results shown in Table 2, the magnetic recording media of this invention each surface of which was brought into contact with steel as a carbon steel alloy, tungsten carbide (WC) or titanium carbide (TiC) as a super hard alloy, each made from powders having a Mohs' hardness of at least 6, and rubbed with the alloy, are excellent in head abrasion, head cleaning characteristics, and drop out, yet keeping good running durability, as compared to the case of using a sapphire as the crystal of aluminum oxide, etc., made from powders having a Mohs' hardness of at least 6.

to 20 was adjusted to 0.860, and that of Comparison Examples 21 to 22 was adjusted 0.830.

Ra of Comparison Example 23 was 0.04 μm, and the others were all 0.01 μm (cut of=0.25 mm).

RF Output

Under a low-humidity condition (25° C., 10% RH), RF recording was conducted using VPR3 VTR made by Ampex Co., thereafter, repeated running of 50 passes was conducted, and the reduction in RF output of reproduction was measured.

TABLE 3

| Example No. | Material | Tape Tension (g) | Number of Blade | Blade Applied Portion | Head Abrasion (100 hr Conversion) (μm) | Rf Output (dB) |
|---|---|---|---|---|---|---|
| 8 | WC | 100 | 1 | Blade edge | 13 | −2.0 |
| 9 | " | 100 | 2 | " | 10 | −2.0 |
| 10 | " | 100 | 3 | " | 8 | −2.5 |
| 11 | " | 100 | 1 | Back obtuse angle portion | 14 | −2.0 |
| 12 | " | 100 | 2 | " | 12 | −2.0 |
| 13 | " | 50 | 2 | Blade edge | 15 | −2.0 |
| 14 | " | 100 | 2 | " | 10 | −2.0 |
| 15 | " | 200 | 2 | " | 9 | −2.5 |
| Comp. Ex. 9 | Steel | 100 | 2 | Blade edge | 100 | −5.0 |
| Comp. Ex. 10 | " | 300 | 2 | " | 90 | −5.0 |
| Comp. Ex. 11 | " | 300 | 4 | " | 90 | −6.0 |
| Comp. Ex. 12 | Sapphire | 100 | 2 | " | 120 | −8.0 |
| Comp. Ex. 13 | " | 300 | 2 | " | 120 | −9.0 |
| Comp. Ex. 14 | " | 300 | 4 | " | 120 | −9.0 |
| Comp. Ex. 15 | Ceramic | 100 | 2 | " | 110 | −8.0 |
| Comp. Ex. 16 | " | 300 | 2 | " | 110 | −7.0 |
| Comp. Ex. 17 | " | 300 | 4 | " | 100 | −7.0 |
| Comp. Ex. 18 | WC (Co = 10 wt %) | 100 | 2 | Blade edge | 60 | −4.0 |
| Comp. Ex. 19 | " | 300 | 2 | " | 50 | −4.0 |
| Comp. Ex. 20 | " | 100 | 6 | " | 60 | −3.0 |
| Comp. Ex. 21 | Sapphire | 100 | 2 | " | 10 | −10.0> |
| Comp. Ex. 22 | " | 300 | 6 | " | 9 | −10.0> |
| Comp. Ex. 23 | WC | 50 | 2 | Blade edge (Ra = 0.04 μm) | 20 | −5.0 |

*WC: Super hard blade of WC containing 6 wt % of Co
Steel: Steel blade
Sapphire: Sapphire blade of $Al_2O_3$
Ceramic: Ceramic blade of Mo—$_{Al-Cn}$

EXAMPLES 8 TO 15 AND COMPARISON EXAMPLES 9 TO 23

By following the same procedure as Example 1 except that the contact-rubbing condition was changed as shown in Table 3 and the following characteristics were measured in addition to the head abrasion characteristics, and the results obtained are shown in Table 3.

By changing the orientation condition, the squareness ratio of Examples 8 to 15 and Comparison Examples 9

As is clear from the results shown in Table 3 above, the magnetic recording media of this invention were excellent in head abrasion characteristics and RF output reduction characteristics. In particular, in the case of using tungsten carbide (WC), the head abrasion could be effectively reduced and the life of the head could be prolonged more than 10 times. Also, in this case, according to the process of this invention, the output was not reduced and thus the process of this invention showed remarkable effects as compared to the conventional process.

EXAMPLES 16 TO 24 AND COMPARISON EXAMPLES 24 TO 30

A magnetic coating composition was prepared by placing composition [I'] for magnetic layer shown below in a kneader followed by sufficiently kneading, adding thereto composition [II'] shown below followed by sufficiently kneading, and adding composition [III'] followed by dispersing.

| Magnetic layer composition: | |
|---|---|
| [I']: | |
| Metal alloy powder (nitrogen adsorption specific surface area 60 m²/g, Hc: 1500 Oe) | 300 parts |
| Vinyl chloride resin (MR 110, trade name, made by Nippon Zeon K.K.) | 18 parts |
| Polyurethane resin (UR 8300, trade name, made by Toyobo Co., Ltd.) | 24 parts |
| Carbon black (Mitsubishi 3250B, trade name, made by Mitsubishi Kasei Corporation, mean grain size 10 mµ | 10 parts |
| Abrasive, α-Al₂O₃ (HIT55, trade name, made by Sumitomo Chemical Co., Ltd.) | 20 parts |
| Oleic acid | 3 parts |
| Cyclohexanone | 150 parts |
| [II']: | |
| Butyl acetate | 850 parts |
| Stearic acid amide | 3 parts |
| [III']: | |
| Polyisocyanate (Colonate 3040, trade name, made by Bayer A.G.) | 20 parts |
| Behenic acid | 3 parts |
| Methyl ethyl ketone | 100 parts |

After adjusting the viscosity, the coating composition was coated on a polyethylene terephthalate film (non-magnetic support) of 10 µm in thickness at a dry thickness of 3.0 µm and after orienting in the longitudinal direction using a magnetic of 3,000 Gausses, dried, and then calendered to form a magnetic layer.

Then, a coating composition for back layer was prepared by kneading and dispersing composition [I'] for back layer shown below in a ball mill and adding thereto composition [II'] and the composition [III'] and coated on the back surface of the non-magnetic support at a dry thickness of 0.5 µm to form a back layer.

| Back Layer Composition: | |
|---|---|
| [I']: | |
| Carbon black (Condactex SC, trade name, made by Cabot Corporation, nitrogen adsorption specific area 200 m²/g, mean grain size 20 mµ) | 85 parts |
| Carbon black (Leven MTP, trade name, made by Corombian Co., nitrogen adsorption specific surface area 8 m²/g, mean grain size 250 mµ) | 5 parts |
| Polyurethane polycarbonate resin (FJ2, made by Dainichiseika Color & Chemicals Mfg. Co., Ltd.) | 10 parts |
| Nitrocellulose resin (FM200, trade name, made by Daicel Chemical Industries, Ltd.) | 80 parts |
| [II']: | |
| Abrasive, α-alumina (HIT55, trade name, made by Sumitomo Chemical Co., Ltd.) | 0.2 part |
| Methyl ethyl ketone | 750 parts |
| Cyclohexanone | 250 parts |
| [III']: | |
| Polyisocyanate (Colonate 3040, trade name, made by Nippon Polyurethane K.K.) | 20 parts |
| Lubricant (Silicone KF69, trade name, made by Shin-Etsu Chemical Co., Ltd.) | 0.1 part |
| Lubricant (copper oleate) | 0.1 part |
| Methyl ethyl ketone | 500 parts |

Then, the magnetic recording medium was slit into 8 mm in width. Then, the following properties were measured and the results are shown in Table 4 below.

Ra of Comparison Example 30 was 0.03 µm and the others were all 0.005 µm (cut off=0.25 mm).

Evaluation Method

Head Abrasion and Head Clogging

Under a high-humidity condition (25° C., 70 RH) repeated running test of 20 passes was conducted using VTR made by Sony Corporation and the abraded amount was observed. Further, the tape-running under the same condition was repeated until head clogging takes place and the number of repeating was counted.

RF Output

Under a low-humidity condition (25° C., 10% RH), RF recording was conducted using VTR made by Sony Corporation, a repeated running test of 20 passes was conducted, and the reduction of the RF output of reproduction was measured.

TABLE 4

| Example No. | Material | Tape Tension (g) | Number of Blade | Blade Applied Portion | Squareness Ratio | Head Abrasion (100 hr Conversion) (µm) | Head Clogging | Rf Output (dB) |
|---|---|---|---|---|---|---|---|---|
| 16 | WC | 100 | 1 | Blade edge | 0.85 | 6 | 100< | −2.0 |
| 17 | " | 100 | 3 | " | " | 5 | " | −2.0 |
| 18 | " | 100 | 6 | " | " | 4 | " | −2.5 |
| 19 | " | 100 | 1 | Black obuse angle portion | " | 6 | " | −2.0 |
| 20 | " | 100 | 3 | " | " | 6 | " | −2.0 |
| 21 | " | 50 | 6 | Blade edge | " | 7 | " | −2.0 |
| 22 | " | 100 | 6 | " | " | 5 | " | −2.0 |
| 23 | " | 200 | 6 | " | " | 5 | " | −2.5 |
| 24 | " | 100 | 3 | " | 0.80 | 5 | " | −2.5 |
| Comp. Ex. 24 | Stainless steel | 100 | 6 | Blade edge | 0.85 | 80 | 15 passes | −5.0 |
| Comp. Ex. 25 | " | 300 | 12 | " | " | 75 | 20 passes | −5.0 |
| Comp. Ex. 26 | Sapphire | 100 | 6 | " | " | 100 | 10 passes | −6.0 |
| Comp. Ex. 27 | " | 100 | 12 | " | " | 90 | 15 | −8.0 |
| Comp. Ex. 28* | WC | 100 | 1 | " | 0.83 | 5 | 100< | −10.0 |
| Comp. Ex. 29* | " | 100 | 3 | " | 0.80 | 5 | 100< | −10.0> |

TABLE 4-continued

| Example No. | Material | Tape Tension (g) | Number of Blade | Blade Applied Portion | Squareness Ratio | Head Abrasion (100 hr Conversion) (μm) | Head Clogging | Rf Output (dB) |
|---|---|---|---|---|---|---|---|---|
| Comp. Ex. 30* | " | 100 | 3 | " | 0.85 | 15 | 100< | −10.0> |

*Reference Example

As is clear from the results shown in Table 4, the magnetic recording media of this invention showed the excellent performance in head abrasion, clogging characteristics, and RF output reduction characteristics. In particular, in the case of using WC, the head abrasion could be reduced, the head clogging characteristics were excellent, and the head life could be prolonged more than 15 times. Also, in this case, the output was not reduced in the case of the process of this invention and thus the process of this invention was very effective as compared to the conventional process.

EXAMPLES 25 TO 30 AND COMPARISON EXAMPLES 31 TO 33

A magnetic coating composition was prepared by placing magnetic layer composition [I''] shown below in a kneader followed by sufficiently kneading, adding composition [II''] shown below to the mixture followed by sufficiently kneading, and then dispersing composition [III''] in the kneaded mixture.

| Magnetic layer composition: | |
|---|---|
| [I'']: | |
| Co-containing γ-$Fe_2O_3$ powder (nitrogen adsorption specific surface area 50 $m^2$/g, Hc 750 Oe) | 100 parts |
| Carbon black (Asahi 70, trade name, made by Asahi Carbon Co., Ltd.) | 6 parts |
| Vinyl chloride-vinyl acetate resin (MR 110, trade name, made by Nippon Zeon Co., Ltd.) | 12 parts |
| Polyurethane resin (UR8600, trade name, made by TOYOBO CO., LTD.) | 6 parts |
| Oleic acid | 0.5 parts |
| Methyl ethyl ketone | 48 parts |
| [II'']: | |
| Abrasive (AKP20, trade name, made by Sumitomo Chemical Co., Ltd.) | 10 parts |
| Polyurethane resin (C7209, trade name, made by DAINIPPON INK & CHEMICALS, INC.) | 2 parts |
| Methyl ethyl ketone | 20 parts |
| [III'']: | |
| Polyisocyanate (Colonate 3040, trade name, made by Nippon Polyurethane K.K.) | 8 parts |
| Myristic acid | 1 part |
| Fatty acid ester | shown in Table 5 |
| Methyl ethyl ketone | 20 parts |

After adjusting the viscosity of the magnetic coating composition, the composition was coated on a 14 μm-thick polyethylene terephthalate film (non-magnetic support) at a dry thickness of 5.0 μm. The coated film was subjected to an orientation treatment in the longitudinal direction using a magnet of 3,000 Gausses, dried and then calendered to form a magnetic layer.

Then, a coating composition for a black layer was prepared by kneading and dispersing back layer composition [I''] shown below in a ball mill and adding thereto composition [II''] shown below followed by stirring and coated on the back surface of the support at a dry thickness of 0.5 μm and dried to form a back layer.

| Back layer composition: | |
|---|---|
| [I''] | |
| Carbon black (Valcan XC72, trade name, made by Cabot Corporation) | 100 parts |
| Nitrocellulose (made by Daicel Chemical Industries, Ltd.) | 5 parts |
| Polyurethane polycarbonate resin (FJ2, made by Dainichiseika Color & Chemicals Mfg. Co., Ltd.) | 45 parts |
| Phenoxy resin (PKHH, trade name, made by Union Carbon Corp.) | 15 parts |
| Methyl ethyl ketone | 300 parts |
| [II''] | |
| Polyisocyanate (C 3040, trade name, made by Nippon Polyurethane K.K.) | 20 parts |
| Abrasive (HIT100, trade name, made by Sumitomo Chemical Co., Ltd.) | 0.3 part |
| Lubricant (KF69, trade name, made by Shin-Etsu Chemical Co., Ltd.) | 0.1 part |
| Cupper oleate | 0.1 part |
| Methyl ethyl ketone | 700 parts |

The thus prepared magnetic tape was slit into 0.5 inch in width. Subsequently the magnetic layer thereof was subjected to the contract-rubbing treatment using a blade made from WC powder of 0.5 μ in size containing 10 wt % of Co as shown in FIGS. 1 and 2, wherein the edge angle α, lap angle β and lap angle δ were 60°, 90°, and 15°, respectively, and the pushing force to the tape tension $T_1$ and tape-running speed v were 5 g, 110 g and 360 m/min, respectively. Then, the treated tape was wound up on a reel for VHS type VTR in a length of 250 m.

The properties of the thus obtained samples are shown in Table 5 below. The evaluation methods for the tapes were as follows.

EVALUATION METHOD

Drop Out

After storage at 60° C., 90%RH for one week, the number of drop out (signals of 15 μsec or more and −16dB or less) per minute was measured.

Head Abrasion

In a high humidity condition (25° C., 70%RH), repeated running was conducted for 50 hours, and the abraded amount of the VTR head was measured.

Y S/N and Deterioration of Y S/N

Y S/N was measured using a VHS type VTR at 20° C. and 10% RH. Further, the Y S/N after repeated running times was measured and the deterioration of Y S/N was calculated, taking that at the first running as being 0 dB.

TABLE 5

| Example No. | Fatty Acid Ester Kind | Amount (parts) | Contact-Rubbing Treatment | Drop out | Head Abrasion | Y S/N (dB) | Deterioration in Y S/N (dB) |
|---|---|---|---|---|---|---|---|
| 25 | 2-Hexyldecyl stearate | 1 | conducted | 15 | 0.5 | 0 | 0 |
| 26 | " | 2 | " | 20 | 0.5 | 0 | 0 |
| 27 | 2-Ethylhexyl stearate | 1 | " | 14 | 0.5 | 0 | 0 |
| 28 | " | 2 | " | 16 | 0.5 | 0 | 0 |
| 29 | Isotridecyl stearate* | 1 | " | 17 | 0.5 | 0 | 0 |
| 30 | " | 2 | " | 15 | 0.5 | 0 | 0 |
| Comp. Ex. 31 | Octyl stearate | 1 | not conducted | 52 | 5.3 | −0.4 | −6 |
| Comp. Ex. 32 | Butyl stearate | 1 | " | 78 | 5.8 | −0.5 | −5.5 |
| Comp. Ex. 33 | 2-Hexyldecyl stearate | 1 | " | 43 | 8.1 | −0.3 | −6 |

*Produced by oxo synthesis

It is clearly seen from the results shown in Table 5 that the magnetic recording media of this invention containing the higher fatty acid esters exhibited the excellent properties in drop out, head abrasion, Y S/N and deterionation of Y S/N, as compared to the samples which were not subjected to the contact-rubbing treatment of this invention (Comparison Examples 31 and 33) and the sample which was not subjected to the contact-rubbing and did not contain the higher fatty acid ester of this invention (Comparison Example 32).

While the invention has been described in detail and with reference to specific embodiments thereof, it will be apparent to one skilled in the art that various changes and modifications can be made therein without departing from the spirit and scope thereof.

What is claimed is:

1. A magnetic recording medium having on a non-magnetic support a magnetic layer containing a ferromagnetic powder and a binder, wherein said magnetic layer has been brought into contact with a super hard alloy and rubbed therewith, wherein said super hard alloy is a super hard blade containing tungsten carbide powder as the main component and 5 to 40% by weight of cobalt, and wherein said tungsten carbide powder has a mean size of from 0.1 to 1.0 μm and a Mohs' hardness of at least 6, and further wherein said magnetic layer has a squareness ratio of at least 0.80 and a surface roughness Ra of 0.02 μm or less before coming into contact with said super hard alloy.

2. The magnetic recording medium of claim 1, wherein said magnetic layer contains a higher fatty acid ester.

3. A magnetic recording medium having on a non-magnetic support a magnetic layer containing a ferromagnetic acicular iron oxide powder and a binder and having a ratio of the numbers of diffraction points, N(220)/N(123), from the ferromagnetic powders at the surface of the magnetic layer, as measured by a high-speed reflection electron diffraction, of at least 1.65, wherein said magnetic layer has been obtained by bringing it into contact with a super hard alloy and rubbing it with the super hard alloy, wherein said super hard alloy is a super hard blade containing tungsten carbide powder as the main component and 5 to 40% by weight of cobalt, said tungsten carbide powder having a mean size of from 0.1 to 1.0 μm, and a Mohs' hardness of at least 6, and further wherein said magnetic layer has a squareness ratio of at least 0.80 and a surface roughness Ra of 0.02 μm or less before coming into contact with said super hard alloy.

4. The magnetic recording medium of claim 3, wherein said ratio, N(220)/N(113), of the magnetic layer before contacting and rubbing with the super hard alloy is less than 1.65.

5. A process for producing a magnetic recording medium, which comprises coating a magnetic coating composition containing a ferromagnetic powder and a binder on a non-magnetic support, orienting, drying, calendering to form a magnetic layer having a squareness ratio of a least 0.84 and a surface roughness Ra of not more than 0.02 μm, and bringing the surface of the magnetic layer into contact with super hard alloy, wherein said super had alloy is a super hard blade containing tungsten carbide powder as the main component and 5 to 40% by weight of cobalt, and wherein said tungsten carbide powder has a mean size of from 0.1 to 1.0 μm and a Mohs' hardness of at least 6, and rubbing the surface with the alloy.

6. The process of claim 5, wherein said binder is composed of a vinyl chloride series resin, a polyurethane series resin, and polyisocyanate.

7. The process of claim 5, wherein a back layer is formed on the opposite surface of the non-magnetic support to the magnetic layer-carrying side.

8. The process of claim 5, wherein the magnetic layer contains carbon black.

9. The process of claim 5, wherein said ferromagnetic powder in the magnetic layer is composed of an iron oxide powder or a metal powder and the magnetic recording medium has an Hc of from 650 to 1900 Oe.

10. The process of claim 5, wherein said super hard blade further contains from 0.01 to 5% by weight of tantalum carbide.

11. A process for producing a magnetic recording medium, which comprises forming a magnetic layer on a non-magnetic support, bringing the surface of the magnetic layer into contact with super hard alloy, wherein said super hard alloy is a super hard blade containing tungsten carbide powder as the main component and 5 to 40% by weight of cobalt, and wherein said tungsten carbide powder has a mean size of from 0.1 to 1.0 μm and a Mohs' hardness of at least 6, and rubbing the surface with the alloy, wherein a higher fatty acid ester having at least 24 carbon atoms, is added to the magnetic layer during and/or after the formation of the magnetic layer.

12. The process of claim 11, wherein said higher fatty acid ester is added to the magnetic layer before or after contacting and rubbing of the magnetic layer.

* * * * *